United States Patent
Wong et al.

(10) Patent No.: US 12,163,580 B2
(45) Date of Patent: Dec. 10, 2024

(54) SEGMENTED PULLEY AND SEGMENTED PULLEY TRANSMISSION INCLUDING THE SAME

(71) Applicant: 1783590 ONTARIO INC., Toronto (CA)

(72) Inventors: Anthony Wong, Scarborough (CA); Jaroslaw Lutoslawski, Bradford (CA); Sarah Jean Fondyga, Toronto (CA)

(73) Assignee: 1783590 ONTARIO INC., Toronto (CA)

( * ) Notice: Subject to any disclaimer, the term of this patent is extended or adjusted under 35 U.S.C. 154(b) by 102 days.

(21) Appl. No.: 17/609,749

(22) PCT Filed: Nov. 29, 2019

(86) PCT No.: PCT/CA2019/051712
§ 371 (c)(1),
(2) Date: Nov. 8, 2021

(87) PCT Pub. No.: WO2020/223786
PCT Pub. Date: Nov. 12, 2020

(65) Prior Publication Data
US 2022/0228655 A1     Jul. 21, 2022

Related U.S. Application Data

(60) Provisional application No. 62/845,376, filed on May 9, 2019.

(51) Int. Cl.
*F16H 55/54*     (2006.01)
*F16H 9/24*     (2006.01)

(52) U.S. Cl.
CPC ............... *F16H 55/54* (2013.01); *F16H 9/24* (2013.01)

(58) Field of Classification Search
CPC .. B62M 9/14; F16H 9/24; F16H 55/54; F16H 55/56
(Continued)

(56) References Cited

U.S. PATENT DOCUMENTS

| | | | |
|---|---|---|---|
| 5,205,794 A * | 4/1993 | Browning | B62M 9/14 474/160 |
| 6,267,699 B1 * | 7/2001 | Gruich | B62M 9/14 474/49 |

(Continued)

FOREIGN PATENT DOCUMENTS

| | | |
|---|---|---|
| CN | 102494093 | 6/2012 |
| DE | 102012008041 | 10/2013 |

(Continued)

OTHER PUBLICATIONS

International Preliminary Report on Patentability in corresponding International Application No. PCT/CA2019/051712, dated Nov. 2, 2021. 6 Pages.

*Primary Examiner* — Henry Y Liu
(74) *Attorney, Agent, or Firm* — Faegre Drinker Biddle & Reath LLP

(57) ABSTRACT

A segmented pulley defining an outer peripheral surface for engaging an endless member of a segmented pulley transmission is provided. The segmented pulley comprises: a plurality of pulley segments configured to be sequentially movable between an engaged region and a disengaged region to transition the endless member between the segmented pulley and a concentric pulley in the segmented pulley transmission, each of the pulley segments having a body defining a portion of the outer peripheral surface. The plurality of pulley segments includes a transition segment having an integrated support extending from the body of the transition segment, the integrated support being configured to support the endless member when transitioning the end- (Continued)

less member between the segmented pulley and the adjacent pulley in the segmented pulley transmission. A segmented pulley transmission comprising the segmented pulley is further provided.

16 Claims, 12 Drawing Sheets

(58) Field of Classification Search
USPC .................................................. 474/47, 49
See application file for complete search history.

(56) References Cited

U.S. PATENT DOCUMENTS

| | | | |
|---|---|---|---|
| 6,431,573 B1 | 8/2002 | Lerman | |
| 8,257,209 B1* | 9/2012 | Lane | F16H 9/10 |
| | | | 474/70 |
| 8,753,236 B2* | 6/2014 | Wong | F16H 9/24 |
| | | | 474/47 |
| 9,816,598 B2* | 11/2017 | Wong | F16H 9/06 |
| 10,988,207 B1* | 4/2021 | Earle | B62M 25/08 |
| 10,989,281 B2* | 4/2021 | Allen | B62M 9/10 |
| 11,214,333 B2* | 1/2022 | Zubieta Andueza | B62M 9/14 |
| 11,279,441 B2* | 3/2022 | Zubieta Andueza | B62M 9/12 |
| 11,572,131 B2* | 2/2023 | Allen | B62M 25/04 |
| 11,661,145 B2* | 5/2023 | Schuster | B62M 9/08 |
| | | | 477/47 |
| 11,685,468 B2* | 6/2023 | Zubieta Andueza | B62M 9/12 |
| | | | 474/156 |
| 2009/0124440 A1 | 5/2009 | Milne | |
| 2011/0045928 A1* | 2/2011 | Wong | F16H 9/24 |
| | | | 474/47 |
| 2013/0267362 A1* | 10/2013 | Gheciu | B62M 9/105 |
| | | | 474/164 |
| 2014/0155207 A1* | 6/2014 | Wong | F16H 9/24 |
| | | | 474/163 |
| 2014/0248982 A1 | 9/2014 | Schuster | |
| 2016/0040772 A1* | 2/2016 | Appleton | F16H 55/54 |
| | | | 474/55 |
| 2016/0169363 A1* | 6/2016 | Wong | F16H 9/24 |
| | | | 474/69 |
| 2017/0283006 A1* | 10/2017 | Schuster | F16H 55/54 |
| 2018/0231108 A1* | 8/2018 | Akbari Rostami | F16H 9/10 |
| 2020/0263767 A1* | 8/2020 | Allen | F16H 9/24 |
| 2020/0377174 A1* | 12/2020 | Allen | B62M 9/123 |
| 2021/0003201 A1* | 1/2021 | Wong | F16H 55/12 |
| 2021/0031877 A1* | 2/2021 | Zubieta Andueza | B62M 9/105 |
| 2021/0031878 A1* | 2/2021 | Zubieta Andueza | B62M 9/12 |
| 2021/0031879 A1* | 2/2021 | Zubieta Andueza | B62M 9/14 |

FOREIGN PATENT DOCUMENTS

| | | |
|---|---|---|
| EP | 3251938 | 12/2017 |
| FR | 429909 | 10/1999 |
| WO | 2012009571 | 1/2012 |

\* cited by examiner

SEGMENTED PULLEY AND SEGMENTED PULLEY TRANSMISSION INCLUDING THE SAME

CROSS-REFERENCE TO RELATED APPLICATION

This application is the US national stage entry of PCT/CA2019/051712 filed on Nov. 29, 2019, which claims the benefit of U.S. Provisional Patent Application No. 62/845,376 filed on May 9, 2019 and titled SEGMENTED PULLEY AND SEGMENTED PULLEY TRANSMISSION INCLUDING THE SAME, the entireties of each of which are specifically incorporated herein by reference.

FIELD

The subject disclosure generally relates to transmissions, and more particularly to a segmented pulley for a segmented pulley transmission and to a segmented pulley transmission including the same.

BACKGROUND

Transmissions are well known and can be used to change the ratio between rotating elements in a power train. Potential applications for transmissions are numerous and include motor vehicles, human-powered vehicles, maritime craft and heavy machinery, such as pumps, turbines, mixers, winches, centrifuges and shredders.

Clutchless multi-ratio transmissions allow the ratio between rotating elements to be changed while the transmission is under load. Certain mechanical problems can affect clutchless multi-ratio transmissions that limit their widespread utilization; specifically, the ability of such transmission systems to function at high speeds or under significant loads effectively and efficiently in practical applications. In addition, ratcheting, slippage, and tensioning problems can limit the commercial viability of such transmissions by decreasing their reliability, decreasing their efficiency and increasing wear. Accordingly, segmented pulley transmissions have been developed to reduce or alleviate at least some of these mechanical problems.

For example, U.S. Pat. No. 8,753,236 to Wong et al. discloses a segmented pulley transmission, wherein a pulley assembly is mounted on an axle. The pulley assembly includes a core pulley having a first set of mating features on a peripheral surface thereof and a pulley segment set that comprises a number of pulley segments slidably mounted in the pulley assembly and arranged in a ring concentric with the core pulley. The pulley segments are individually actuatable into and out of the pulley assembly. The pulley segments have a second set of mating features on a peripheral surface matching the first set of mating features. An endless drive member has corresponding mating features on an inside surface for engaging the first and second sets of mating features of the core pulley and the pulley segments in an engaging position. Contact between the endless drive member and the core pulley defines a contact zone. An actuator actuates the pulley segments between the engaging and non-engaging positions when the pulley segments are outside of the contact zone.

U.S. Pat. No. 9,816,598 to Wong discloses a key pulley segment for a segmented pulley transmission that is either first or last in a pulley segment set to engage an endless member. The first or last key segment teeth to engage or disengage the endless member, respectively, are shortened or completely trimmed, and the adjacent pulley segment to the key segment is elongated such that a portion of the tooth profile extends toward the key segment. The shortened tooth or teeth and elongated adjacent segment together allow for many pulley segments to be designed as key segments. Completely trimmed teeth may be engineered to create a supporting surface for the endless member on the key segment. The elongated adjacent segment may have an extending portion which slidably mates with the supporting surface of the key segment, thereby receiving radial support therefrom. Multiple pulley segments from different pulley segment sets may be connected or constructed to move together in a unified stack. Unified stacks may be moved by way of a cam or roller-cam system. Chassis-mounted cams engage the rollers outside of the contact zone and, via roller-arms, individual segments of a unified stack are moved into or out of engagement. Rollers may be actuated into and out of engagement with the cams by electromagnets, fixable mounted in an array.

While the contributions of known segmented pulley transmissions are laudable, improvements and/or alternatives are generally desired. It is therefore an object to provide a novel segmented pulley for a segmented pulley transmission and a novel segmented pulley transmission.

SUMMARY

It should be appreciated that this summary is provided to introduce a selection of concepts in a simplified form that are further described below in the detailed description of embodiments. This summary is not intended to be used to limit the scope of the claimed subject matter.

Accordingly, in one aspect there is provided a segmented pulley defining an outer peripheral surface for engaging an endless member of a segmented pulley transmission, the segmented pulley comprising: a plurality of pulley segments configured to be sequentially movable between an engaged region and a disengaged region to transition the endless member between the segmented pulley and a concentric pulley in the segmented pulley transmission, each of the pulley segments having a body defining a portion of the outer peripheral surface, wherein the plurality of pulley segments includes a transition segment having an integrated support extending from the body of the transition segment, the integrated support being configured to support the endless member when transitioning the endless member between the segmented pulley and the concentric pulley in the segmented pulley transmission.

In one or more embodiments, the integrated support extends circumferentially beyond the portion of the outer peripheral surface defined by the body of the transition segment.

In one or more embodiments, the integrated support includes a transition surface for supporting the endless member when transitioning the endless member between the segmented pulley and the concentric pulley in the segmented pulley transmission. The transition surface may be spaced apart from the portion of the outer peripheral surface defined by the body of the transition segment. The integrated support may include a proximal portion and a distal portion, and wherein the distal portion defines the transition surface.

In one or more embodiments, a recess is defined in the integrated support for accommodating a portion of an adjacent pulley segment in the plurality of pulley segments. The portion of the adjacent pulley segment may be an enlarged portion that is configured to provide physical support to the adjacent pulley segment during rotational operation of the segmented pulley transmission. The enlarged portion may include a physical support feature for providing the physical support to the adjacent pulley segment. The physical support feature may be a hole defined in the enlarged portion, for engaging a support rod of the segmented pulley transmission to provide the physical support to the adjacent pulley segment.

In one or more embodiments, the plurality of pulley segments includes two of the transition segments that are oppositely oriented in the plurality of pulley segments.

In one or more embodiments, the integrated support is configured to inhibit the endless member from bending beyond a predetermined minimum bend radius, when transitioning the endless member between the segmented pulley and the concentric pulley in the segmented pulley transmission.

In one or more embodiments, the integrated support is configured to control slack in the endless member between the segmented pulley and the concentric pulley, when transitioning the endless member between the segmented pulley and the concentric pulley in the segmented pulley transmission.

According to another aspect, there is provided a segmented pulley transmission for rotationally coupling a first rotatable member and a second rotatable member in a power train, the segmented pulley transmission comprising: a first pulley assembly for coupling to the first rotatable member, the first pulley assembly comprising a first pulley and a second pulley concentric with the first pulley, the second pulley being a segmented pulley as defined in any of the above paragraphs of this Summary; a second pulley assembly for coupling to the second rotatable member and spaced apart from the first pulley assembly; and an endless member engaging the first pulley assembly and the second pulley assembly and extending therebetween, to rotationally couple the first pulley assembly and the second pulley assembly.

In one or more embodiments, the segmented pulley transmission may further comprise an idler pulley engaging the endless member and configured to control slack in the endless member.

In one or more embodiments, the segmented pulley transmission may further comprise an actuator coupled to the plurality of pulley segments of the segmented pulley and configured to sequentially move the plurality of pulley segments between the engaged region and the disengaged region, to transition the endless member between the first pulley and the second pulley.

BRIEF DESCRIPTION OF THE DRAWINGS

Embodiments will now be described more fully with reference to the accompanying drawings, in which.

DETAILED DESCRIPTION OF EMBODIMENTS

Figure 1:
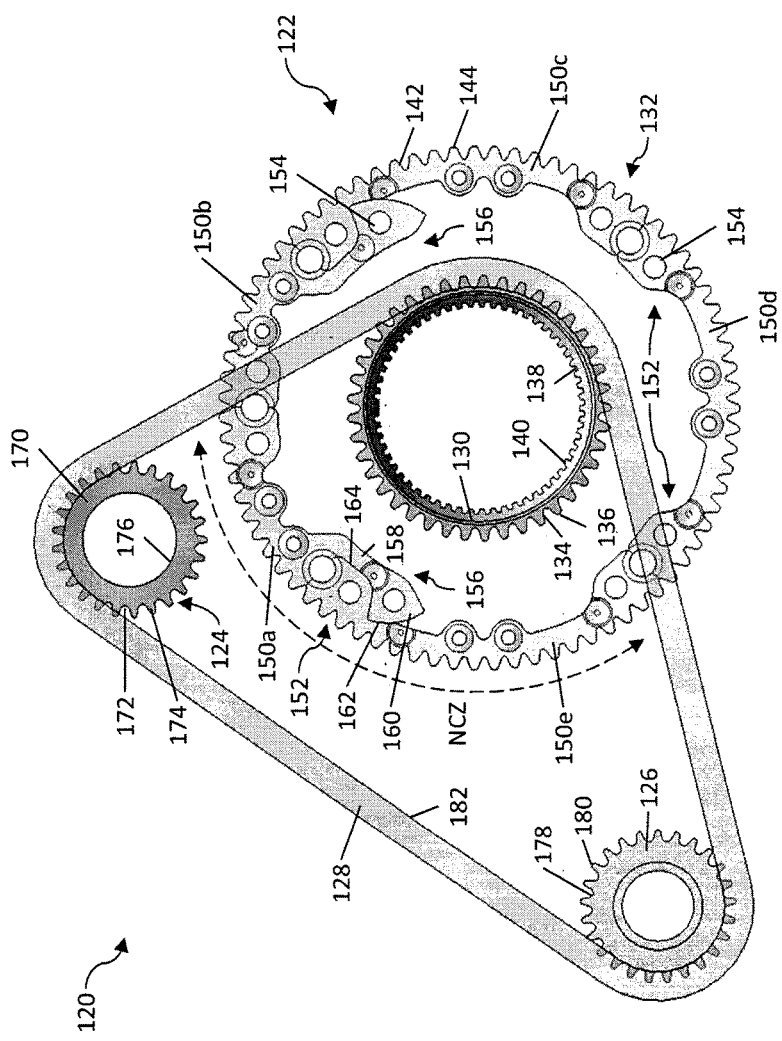
FIG. 1 is a simplified front view of a segmented pulley transmission.

The foregoing summary, as well as the following detailed description of certain embodiments will be better understood when read in conjunction with the accompanying drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising," "having" or "including" an element or feature or a plurality of elements or features having a particular property may further include additional elements or features not having that particular property. Also, it will be appreciated that the terms "comprises," "has" and "includes" mean "including but not limited to" and the terms "comprising," "having" and "including" have equivalent meanings.

As used herein, the term "and/or" can include any and all combinations of one or more of the associated listed elements or features.

It will be understood that when an element or feature is referred to as being "on," "attached" to, "connected" to, "coupled" with, "engaged" with, "contacting," etc. another element or feature, that element or feature can be directly on, attached to, connected to, coupled with, engaged with or contacting the other element or feature or intervening elements may also be present. In contrast, when an element or feature is referred to as being, for example, "directly on," "directly attached" to, "directly connected" to, "directly coupled" with, "directly engaged" with or "directly contacting" another element of feature, there are no intervening elements or features present. Additionally, when an element or feature is referred to as being "attached" to, "connected" to, "coupled" with, "engaged" with, "contacting," etc. another element or feature, it should be understood as not necessarily excluding further elements or features being attached to, connected to, couple with, engaged with, contacting, etc. those same elements or features. For example, in some instances, elements may be coupled in a one-to-one relationship; in other instances, a single element may be coupled to a plurality of other elements, or vice versa.

It will be understood that spatially relative terms, such as "under," "below," "lower," "over," "above," "upper," "front," "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art.

Figure 12:
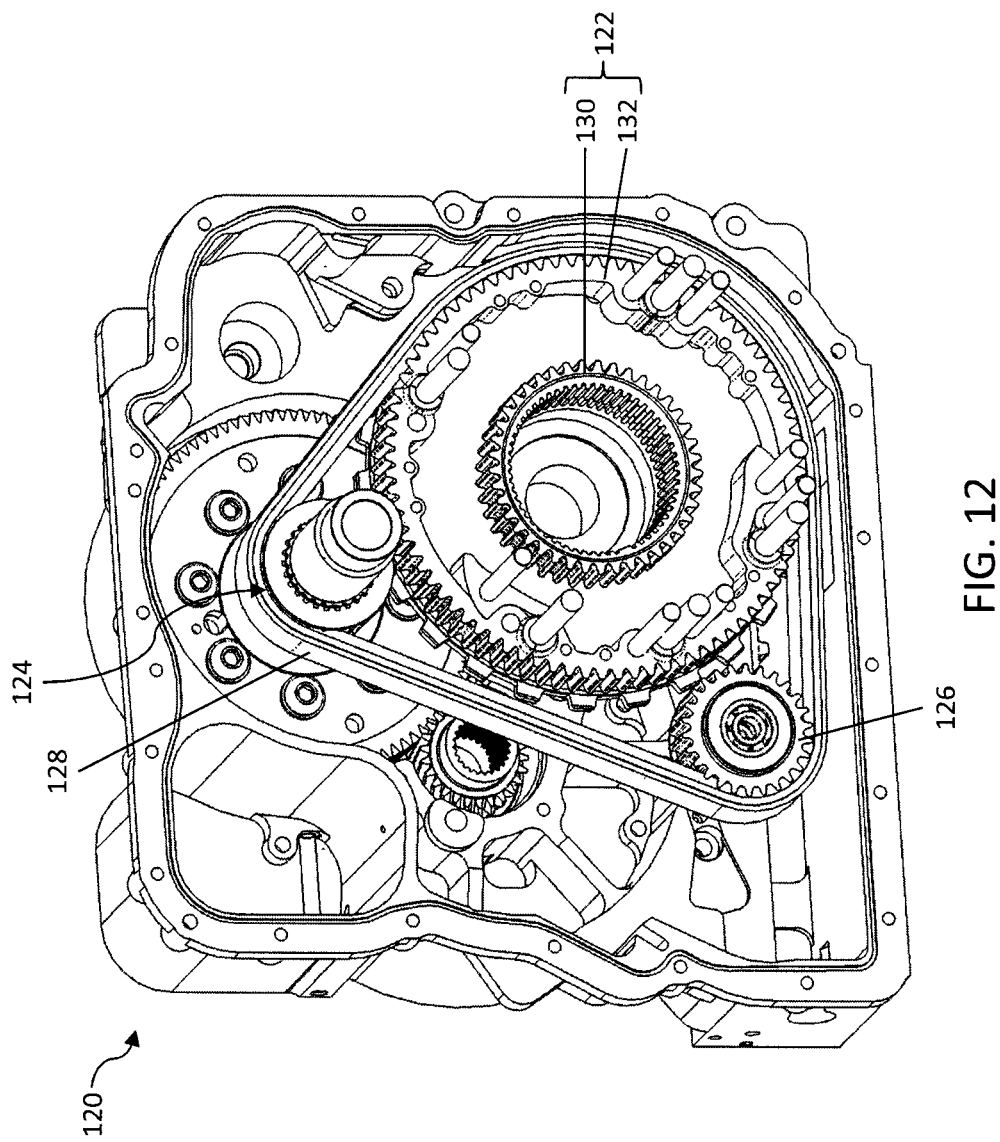
FIG. 12 is an axonometric view of the segmented pulley transmission of FIG. 1, with a portion of the external housing omitted.

FIG. 12 shows a segmented pulley transmission, generally identified by reference character 120. As will be appreciated, a portion of an external housing of the segmented pulley transmission 120 has been omitted in FIG. 12 to view the interior. FIG. 1 also shows the segmented pulley transmission 120 and has been simplified to facilitate understanding of this description and certain elements of the segmented pulley transmission 120 have been omitted, such as the external housing. In some embodiments, the segmented pulley transmission 120 may include elements shown and described in PCT International Application No. PCT/CA2018/051475 filed on Nov. 20, 2018, and titled PULLEY ASSEMBLY FOR A SEGMENTED PULLEY TRANSMISSION AND ACTUATOR SYSTEM FOR THE SAME, the relevant portions of which are incorporated herein by reference.

The segmented pulley transmission 120 is configured to rotationally couple a first rotating element and a second rotating element in a power train (not shown) and is configured to change the ratio between the first and second rotating elements. In some embodiments, the first rotating element is a driven axle in the power train and the second rotating element is a driving axle in the power train, or vice versa. The segmented pulley transmission 120 comprises a first pulley assembly 122, a second pulley assembly 124, an idler pulley 126 and an endless member 128. As will be appreciated, the endless member 128 is shown as a schematic representation with mating features omitted. The first pulley assembly 122, the second pulley assembly 124 and the idler pulley 126 are all spaced apart from each other. The endless member 128 extends between and rotationally couples the first pulley assembly 122, the second pulley assembly 124 and the idler pulley 126. During installation of the segmented pulley transmission 120, the first pulley assembly 122 is coupled to the first rotating element in the power train and the second pulley assembly 124 is coupled to the second rotating element in the power train.

The first pulley assembly 122 is configured to be coupled to the first rotating element in the power train. In some embodiments, the first pulley assembly 122, or a portion thereof, is integrally formed with the first rotating element in the power train. The first pulley assembly 122 is configured to engage the endless member 128. The first pulley assembly 122 is rotatable about and concentric with a first axis of rotation. The first pulley assembly 122 comprises a first pulley 130 and a second pulley 132. The second pulley 132 is concentric with the first pulley 130 and may surround the first pulley 130. Both the first pulley 130 and the second pulley 132 are configured for continuous rotational operation with the endless member 128. During a full rotation of the first pulley assembly 122 about the first axis of rotation, either of the first pulley 130 and the second pulley 132 may continuously engage the endless member 128.

The first pulley 130 is configured to be coupled to the first rotating element in the power train. In some embodiments, the first pulley 130 is integrally formed with the first rotating element in the power train. The first pulley 130 is configured to engage the endless member 128, when the first pulley 130 is located in an engaged region as will be described. The first pulley 130 is rotatable about and concentric with the first axis of rotation of the first pulley assembly 122. The first pulley 130 includes an outer peripheral surface 134 for engaging the endless member 128. The outer peripheral surface 134 is generally circular and may comprise a plurality of outer mating features 136, for engaging corresponding mating features on the endless member 128. In some embodiments, the outer mating features 136 are teeth. The first pulley 130 further comprises an inner peripheral surface 138 that is configured to be coupled to the first rotating element of the power train (not shown). The inner peripheral surface 138 is generally circular and may comprise a plurality of inner mating features 140, for coupling to the first rotating element in the power train. In some embodiments, the inner mating features are at least one of keys, teeth and the like. In the subject embodiment, the first pulley 130 comprises a unitary construction. The first pulley 130 is a core pulley of the first pulley assembly 122. That is, the first pulley 130 is the centermost or smallest diameter pulley in the first pulley assembly 122. In other embodiments, the first pulley 130 may be another pulley in the first pulley assembly 122, such as an intermediate pulley that is located between two concentric pulleys in the first pulley assembly 122. In some embodiments, the first pulley 130 may be a segmented pulley.

The second pulley 132 is configured to be coupled to the first rotating element in the power train. The second pulley 132 is configured to engage the endless member 128, when the second pulley 132 is located in the engaged region as will be described. The second pulley 132 is rotatable about and concentric with the first axis of rotation of the first pulley assembly 122. The second pulley 132 includes an outer peripheral surface 142 for engaging the endless member 128. The outer peripheral surface 142 is generally circular and may comprise a plurality of outer mating features 144, for engaging corresponding mating features on the endless member 128. In some embodiments, the outer mating features 144 are teeth. The second pulley 132 is a segmented pulley and comprises a plurality of pulley segments 150a to 150e. The plurality of pulley segments 150a to 150e is circularly arranged to form the second pulley 132.

The plurality of pulley segments 150a to 150e are configured to engage the endless member 128. Accordingly, each of the pulley segments 150a to 150e includes a body that defines a portion of the outer peripheral surface 142 of the second pulley 132. Each of the pulley segments 150a to 150e further includes one or more enlarged portions 152. The enlarged portions 152 are configured to provide physical support during rotational operation of the segmented pulley transmission 120. Each of the enlarged portions 152 provides physical support to the respective pulley segment 150a to 150e in which the enlarged portion 152 is formed. Accordingly, in the subject embodiment, the enlarged portions 152 are generally positioned at the circumferential ends of the pulley segments 150a to 150e. In some embodiments, the segmented pulley assembly includes a plurality of support rods (not shown) for physically supporting the plurality of pulley segments 150a to 150e. An example of a segmented pulley assembly with support rods is shown and described in PCT International Application No. PCT/CA2018/051475. Each of the enlarged portions 152 includes a physical support feature 154 for providing physical support to the respective one of the pulley segments 150a to 150e in which the enlarged portion 152 is formed. In some embodiments, the physical support feature 154 is a hole for receiving one of the support rods. In other embodiments, the physical support feature 154 may be another feature suitable for providing physical support, such as an integrated rod that extends from one or more of the pulley segments 150a to 150c.

The plurality of pulley segments 150a to 150e are configured to be sequentially movable between an engaged region and a disengaged region to transition the endless member between the first pulley 130 and the second pulley 132. In the subject embodiment, the plurality of pulley segments 150a to 150e are configured to be individually movable between the engaged region and the disengaged region. In other embodiments, one or more subsets of the pulley segments 150a to 150e may be configured to be collectively moved between the engaged region and the disengaged region. For example, in some embodiments, two or more of the pulley segments 150a to 150e are configured to be movable together between the engaged region and the disengaged region. In some embodiments, the plurality of pulley segments 150a to 150e are moved between the engaged region and the disengaged region by one or more actuators, such as those described in PCT International Application No. PCT/CA2018/051475. In some embodiments, the plurality of pulley segments 150a to 150e are moved by the actuator system shown and described in U.S. Provisional Patent Application No. 62/845,389 filed on May 9, 2019, and titled ACTUATOR SYSTEM AND SEGMENTED PULLEY TRANSMISSION INCLUDING THE SAME and/or in the PCT International Application of the same title, the entireties of which are all incorporated herein by reference.

In the context of the subject disclosure, the "engaged region" is a region wherein elements of the first pulley assembly 122 will engage the endless member 128 during rotational operation of the first pulley assembly 122, when those elements are unsheltered or unobstructed by other elements of first pulley assembly 122. In contrast, the "disengaged region" is a region wherein elements of the first pulley assembly 122 will not engage the endless member 128 during rotational operation of the first pulley assembly 122, regardless of their exposure or the position of the other elements of the first pulley assembly 122. In the subject embodiment, it will be appreciated that the first pulley 130 is permanently located within the engaged region, as the first pulley 130 will always engage the endless member 128 if unobstructed by other elements during rotational operation of the first pulley assembly 122. In contrast, the plurality of pulley segments 150a to 150e will only be located in the engaged region when moved into a plane defined by the endless member 128.

The plurality of pulley segments 150a to 150e includes one or more transition segments. In the subject embodiment, the plurality of pulley segments 150a to 150e includes two transition segments 150a, 150b. The transition segments 150a, 150b are oppositely oriented in the plurality of pulley segments 150a to 150e. Each of the transition segments 150a, 150b is configured to support the endless member 128 when transitioning the endless member 128 between the first pulley 130 and the second pulley 132. In the subject embodiment, one of the transition segments 150a is configured to support the endless member 128 when transitioning the endless member 128 from the first pulley 130 to the second pulley 132, and the other of the transition segments 150b is configured to support the endless member 128 when transitioning the endless member 128 from the second pulley 132 to the first pulley 130. Accordingly, the transition segment 150a is defined as a pulley expanding transition segment, and the transition segment 150b is defined as a pulley reducing transition segment. Each of the transition segments 150a, 150b includes an integrated support 156 extending from the body of thereof.

The integrated support 156 is configured to support the endless member 128 when transitioning the endless member 128 between the first pulley 130 and the second pulley 132. Supporting the endless member 128 inhibits the endless member 128 from bending beyond a maximum permissible radius when transitioning between the first pulley 130 and the second pulley 132. As will be appreciated, the maximum permissible radius will depend on the endless member 128 and may further depend on a load being transmitted by the endless member 128. The integrated support 156 also controls slack in the endless member 128 between the first pulley 130 and the second pulley 132, by diverting the endless member 128 between the first pulley 130 and the second pulley 132. As will be appreciated, controlling slack in the endless member 128 may help to control tension in the endless member 128 and/or may help to align the endless member 128 with the outer mating features 136, 144 of the first pulley 130 and the second pulley 132.

In some embodiments, each of the integrated supports 156 are the same. In other embodiments, the integrated supports 156 are different. In the subject embodiment, the integrated supports 156 are oppositely oriented and have slightly different shapes, but are otherwise the same. Accordingly, for brevity, only the integrated support 156 extending from the body of transition segment 150a is described below. The integrated support 156 extends circumferentially beyond the portion of the outer peripheral surface 142 defined by the body of the transition segment 150a. The integrated support 156 includes a proximal portion 158 and a distal portion 160. The proximal portion 158 is located adjacent the body of the transition segment 150a and extends therefrom. The distal portion 160 is spaced apart from the body of the transition segment 150a, by the proximal portion 158. In the subject embodiment, the distal portion 160 is an enlarged portion having a physical support feature, as described above. In other embodiments, the distal portion 160 may not be enlarged. The integrated support 156 further includes a transition surface 162 and a recess 164.

As will be appreciated, similar to the integrated supports 156 themselves, the transition surfaces 162 and the recesses 164 of the integrated supports 156 may be the same, or different. In the subject embodiment, the transition surfaces 162 and the recesses 164 are oppositely oriented. Moreover, the transition surfaces 162 have slightly different shapes. However, the transition surfaces 162 and the recesses 164 in the subject embodiment are otherwise the same. Accordingly, for brevity, only the transition surface 162 and the recess 164 of the integrated support 156 extending from the body of transition segment 150a are described below.

The recess 164 is configured to accommodate an enlarged portion 152 of an adjacent one of the pulley segments 150a to 150e, such as pulley segment 150e for transition segment 150a. The recess 164 is defined by at least the proximal portion 158 of the integrated support 156, and may further be defined by the distal portion 160 and/or the body of the transition segment 150a. In some embodiments, the enlarged portion 152 of the adjacent one of the pulley segments 150e nests within the recess 164 of the integrated support 156, without touching the integrated support 156. In other embodiments, the enlarged portion 152 of the adjacent one of the pulley segments 150c may be received within the recess 164, or partially received therein, without touching the integrated support 156. As will be appreciated, including the recess 164 in the integrated support 156 as described above, allows the integrated support 156 to be included without substantially interfering with the physical support provided by the enlarged portion 152 near the end of the adjacent pulley segment 150*e*, and without substantially interfering with movement of the pulley segments between the engaged region and the disengaged region.

The transition surface 162 is configured to support the endless member 128 when transitioning the endless member 128 between the first pulley 130 and the second pulley 132. The transition surface 162 is spaced apart from the body of the transition segment 150*a* by the recess 164 and is defined by the distal portion 160 of the integrated support 156. Accordingly, when transitioning the endless member 128 between the first pulley 130 and the second pulley 132, a portion of the endless member 128 that extends over the recess 164 will be unsupported. As the endless member 128 extends between the first pulley 130 and the second pulley 132, the endless member 128 contacts the transition surface 162 and is diverted around the integrated support 156. Accordingly, by positioning the transition surface 162 of the integrated support 156, slack in the endless member 124 between the first pulley 130 and the second pulley 132 can be controlled.

The second pulley assembly 124 is configured to be coupled to the second rotating element in the power train. In some embodiments, the second pulley assembly 124, or a portion thereof, is integrally formed with the second rotating element in the power train. The second pulley assembly 124 is configured to engage the endless member 128. The second pulley assembly 124 is rotatable about and concentric with a second axis of rotation. In the subject embodiment, the second pulley assembly 124 comprises a single fixed pulley 170. In other embodiments, the secondary pulley assembly 124 may be adjustable and may comprise a plurality of pulleys, such as the first pulley 130 and/or the second pulley 132 described above. The fixed pulley 170 is rotatable about and concentric with the second axis of rotation. The fixed pulley 170 includes an outer peripheral surface 172 for engaging the endless member 128. The outer peripheral surface 172 is generally circular and may comprise a plurality of outer mating features 174, for engaging corresponding mating features on the endless member 128. In some embodiments, the outer mating features 174 are teeth. The fixed pulley 170 further comprises an inner peripheral surface 176 that is configured to be coupled to the second rotating element of the power train (not shown). The inner peripheral surface 176 is generally circular and, in some embodiments, comprises a plurality of inner mating features (not shown). In some embodiments, the inner mating features are at least one of keys, teeth and the like.

The idler pulley 126 is configured to control slack in the endless member 128 between the first pulley assembly 122 and the second pulley assembly 124. The idler pulley 126 is rotatable about and concentric with a third axis of rotation, which is movable within the segmented pulley transmission 120 to control slack in the endless member 128. As will be appreciated, controlling slack in the endless member 128 may help to control tension in the endless member 128 and/or may help to align the endless member 128 with the outer mating features of the first pulley assembly 122 and the second pulley assembly 124. The idler pulley 126 can be moved away from the first pulley assembly 122 and/or the second pulley assembly 124 to reduce slack in the endless member 128. Alternatively, the idler pulley 126 can be moved towards the first pulley assembly 122 and/or the second pulley assembly 124 to provide slack in the endless member 128. The idler pulley 126 is configured to engage the endless member 128. The idler pulley 126 includes an outer peripheral surface 178 for engaging the endless member 128. The outer peripheral surface 182 is generally circular and may comprise a plurality of outer mating features 184, for engaging corresponding mating features on the endless member 128. In some embodiments, the outer mating features 184 are teeth.

The endless member 128 is configured to rotationally couple the first pulley assembly 122, the second pulley assembly 124 and the idler pulley 126. The endless member 128 extends between the first pulley assembly 122, the second pulley assembly 124 and the idler pulley 126. The endless member 128 includes an inner peripheral surface 182 that is configured to engage the outer peripheral surfaces 134, 142, 172, 178 of the first pulley 130, the second pulley 132, the fixed pulley 170 and the idler pulley 126, respectively. Although the endless member 128 is shown in the figures as a schematic representation without any mating features, it will be appreciated that mating features such as teeth and/or holes may be included on at least the inner peripheral surface 182 of the endless member 128. In some embodiments, the inner peripheral surface 182 includes a plurality of complementary mating features for engaging the outer mating features on the outer peripheral surfaces 134, 142, 172, 178. In other embodiments, the inner peripheral surface 182 may not include any mating features and may be generally smooth, and in such embodiments the inner peripheral surface 182 may engage the outer peripheral surface 134, 142, 172, 178 by friction. As will be appreciated, the endless member 128 may comprise a chain, a belt or other suitable type of endless member.

During rotational operation of the segmented pulley transmission 120, the endless member 128 will contact and engage the first pulley assembly 122 within an angular region defined as the contact zone. Conversely, the endless member 128 will not contact or engage the first pulley assembly 122 within an angular region defined as the non-contact zone (NCZ). The pulley segments 150*a* to 150*e* of the second pulley 132 can be moved into or out of the engaged region while positioned in the non-contact zone without interfering with the endless member 128 and while the segmented pulley transmission 120 is under load. As will be appreciated, the non-contact zone will vary depending on whether or not the first pulley 130 is engaged with the endless member 128 and which, if any, of the pulley segments 150*a* to 150*e* of the second pulley 132 are engaged with the endless member 128.

By sequentially moving the pulley segments 150*a* to 150*e* into or out of the engaged region while positioned in the non-contact zone, the endless member 128 may transition from engaging one of the first pulley 130 and the second pulley 132, defined as an "origin pulley," to engaging the other of the first pulley 130 and the second pulley 132, defined as a "destination pulley," without interrupting rotational operation of the segmented pulley transmission 120 and without interrupting a load transmitted through the segmented pulley transmission 120. Transition the endless member 128 between the origin pulley and the destination pulley is referred to as a "shift event."

FIGS. 2 to 6 show a sequence for a shift event that transitions the endless member 128 from engaging the first pulley 130 to engaging the second pulley 132. Prior to the shift event, the endless member 128 is engaged with the first pulley 130 of the first pulley assembly 122, as shown in FIG. 1. Accordingly, the plurality of pulley segments 150*a* to 150*e* are all located in the disengaged region.

Figure 2:
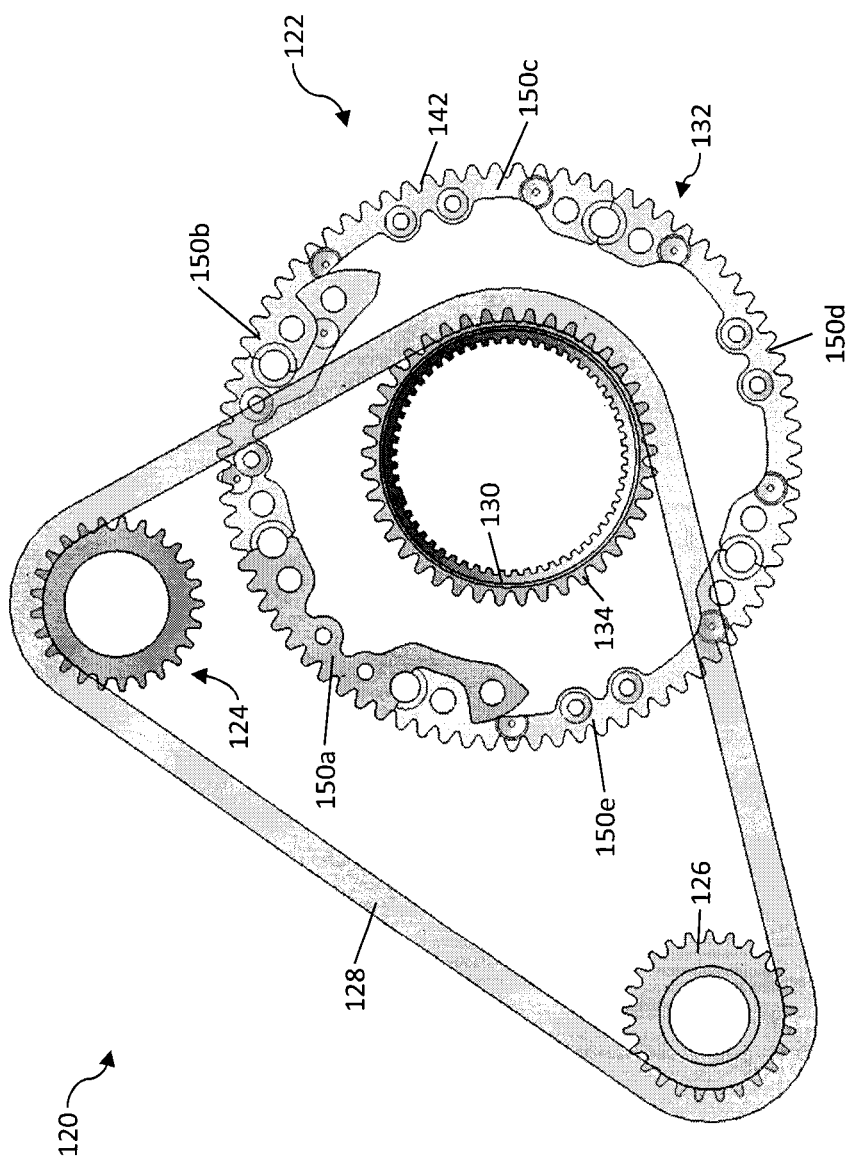
FIGS. 2 to 6 are simplified front views of the segmented pulley transmission of FIG. 1, showing a sequence for transitioning an endless member from a first pulley to a second pulley in the segmented pulley transmission.

At the step shown in FIG. 2, the pulley segment 150a is moved into the engaged region while positioned in the non-contact zone of the first pulley assembly 122. As will be appreciated, in the subject embodiment, the pulley segments 150a to 150e are moved into the engaged region by transversely extending the pulley segments 150a to 150e into the plane defined by the endless member 128. As the first pulley assembly 122 rotates, the pulley segment 150a will enter into the contact zone and will engage the endless member 128 with the transition surface 162 of the integrated support 152 of the pulley segment 150a. The integrated support 152 of the pulley segment 150a inhibits the endless member 128 from bending beyond the maximum permissible radius as the endless member 128 transitions from the first pulley 130 to the second pulley 132, by supporting the endless member 128 with the transition surface 162. As the first pulley assembly 122 further rotates, the portion of the outer peripheral surface 142 defined by the body of the pulley segment 150a engages the endless member 128. As will be appreciated, since the integrated support 156 includes a recess 164, when the endless member 128 extends across the recess 164, a portion 190 of the endless member 128 will be unsupported. This unsupported portion 190 extends from the transition surface 162 to the portion of the outer peripheral surface 142 defined by the body of the pulley segment 150a, and may be generally straight (as shown in FIG. 4).

Figure 3:
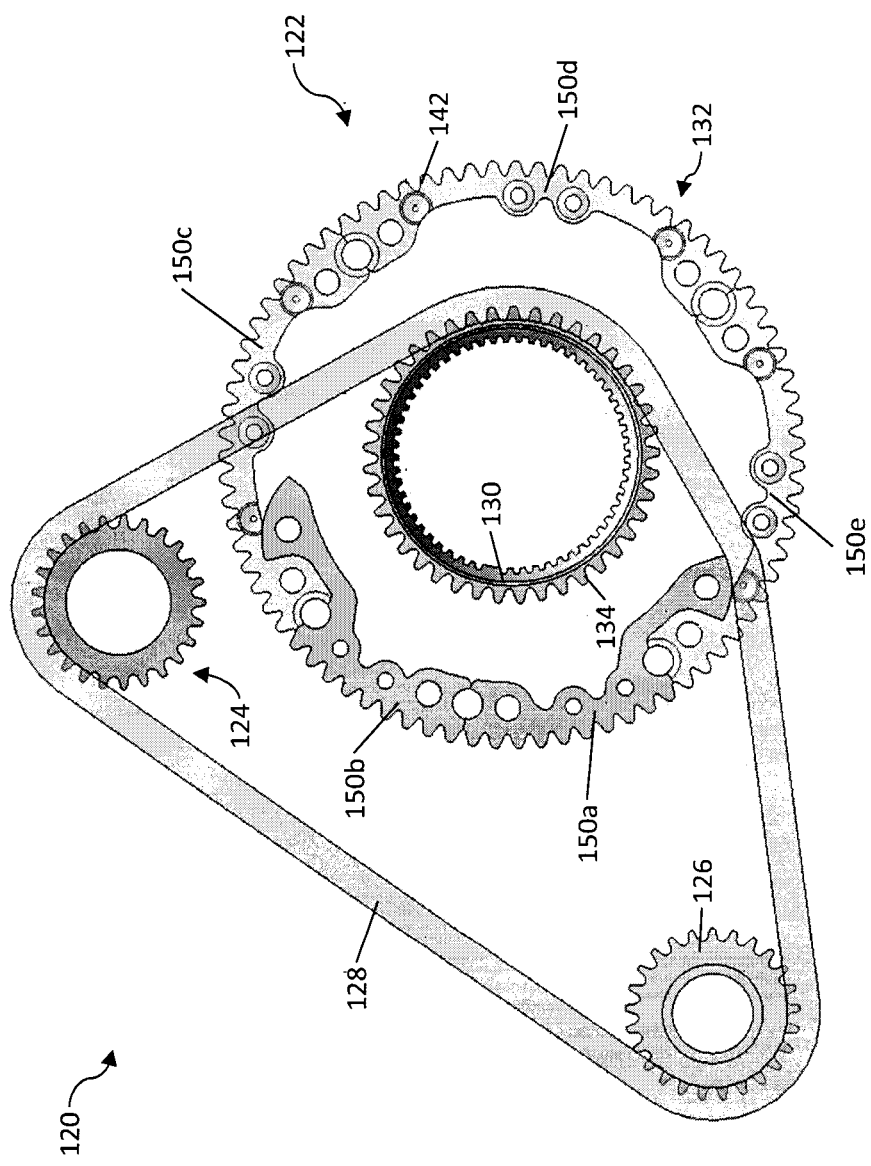

At the step shown in FIG. 3, the pulley segment 150b is moved into the engaged region while positioned in the non-contact zone of the first pulley assembly 122. As the first pulley assembly 122 rotates, the pulley segment 150b will rotationally follow the pulley segment 150a into the contact zone and will engage the endless member 128, with the portion of the outer peripheral surface 142 defined by the body of the pulley segment 150b. However, before the pulley segment 150b may engage the endless member 128 with the transition surface 156 of the integrated support 152 of the pulley segment 150b, the shift event proceeds to the step shown in FIG. 4. Accordingly, during the shift event transitioning the endless member 128 from the first pulley 130 to the second pulley 132, the endless member 128 does not engage the integrated support 152 of the pulley segment 150b.

Figure 4:
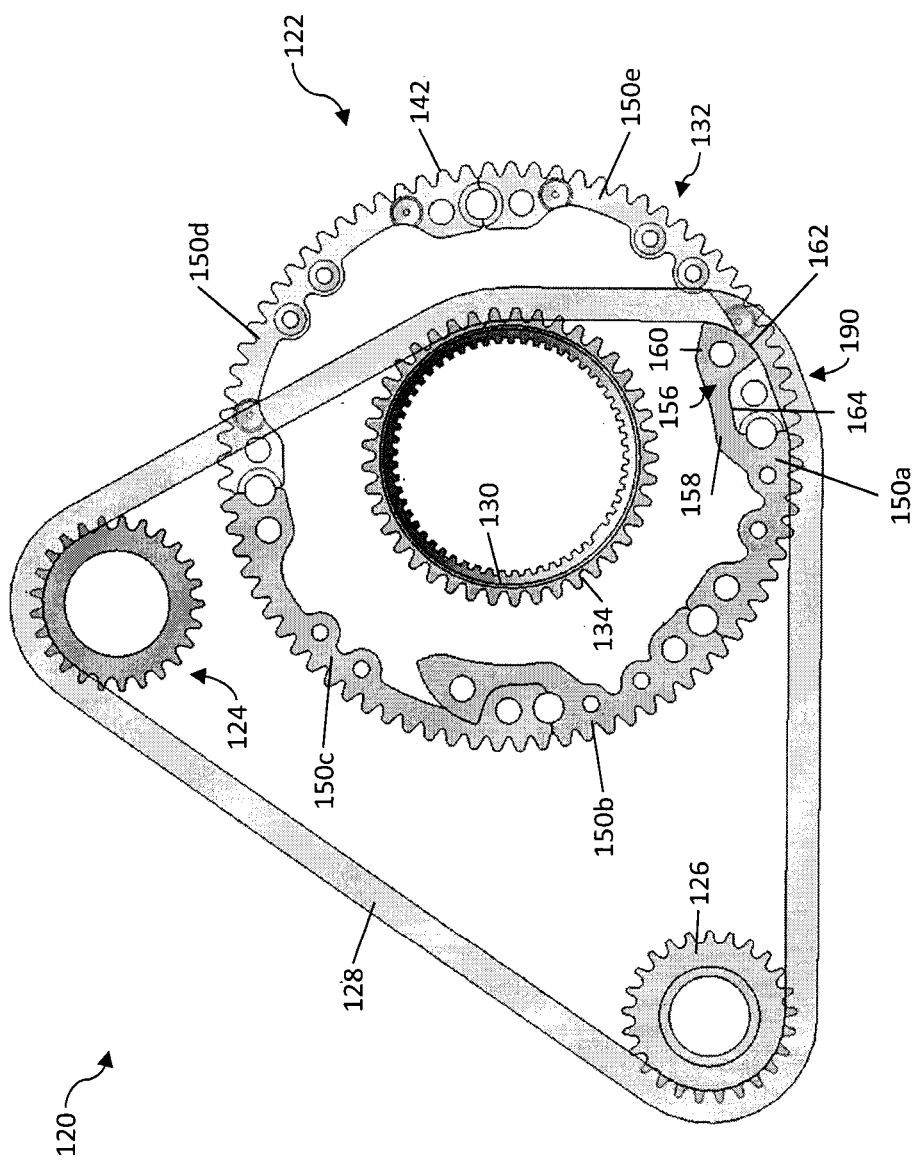
Figure 5:
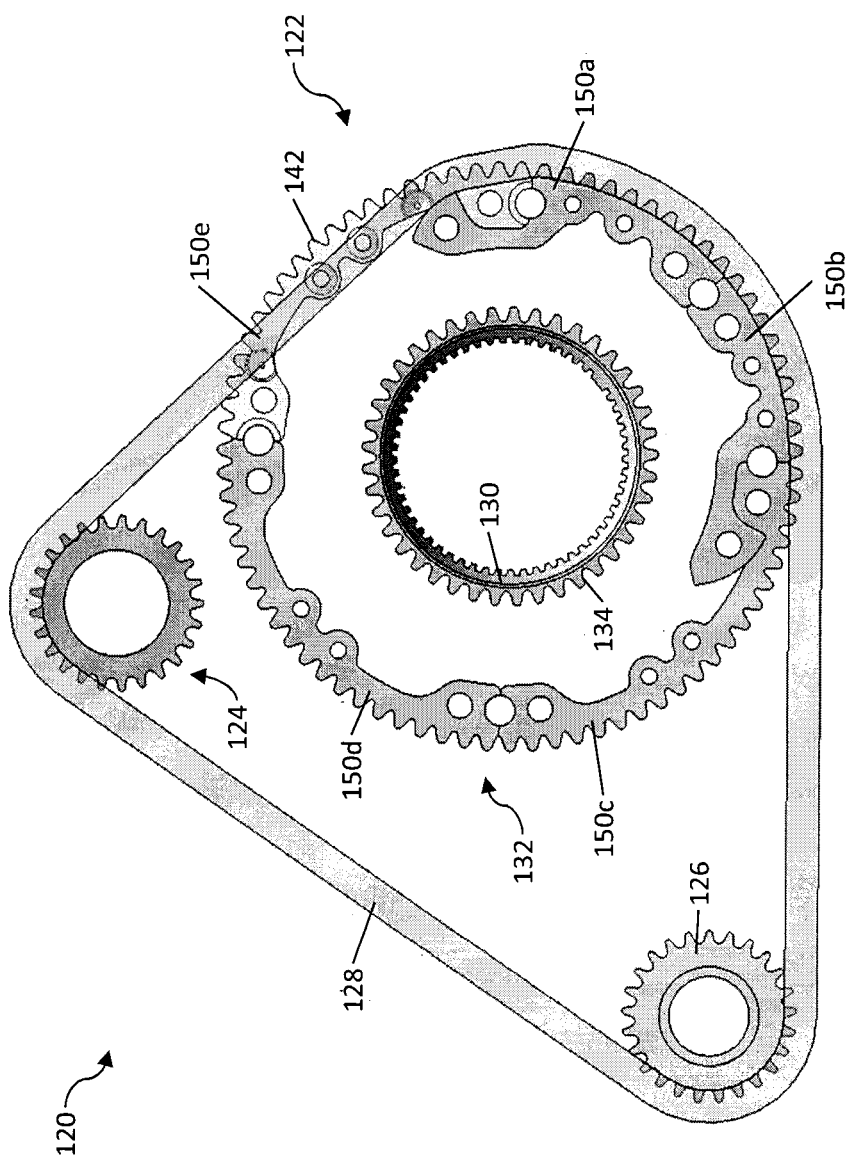
Figure 6:
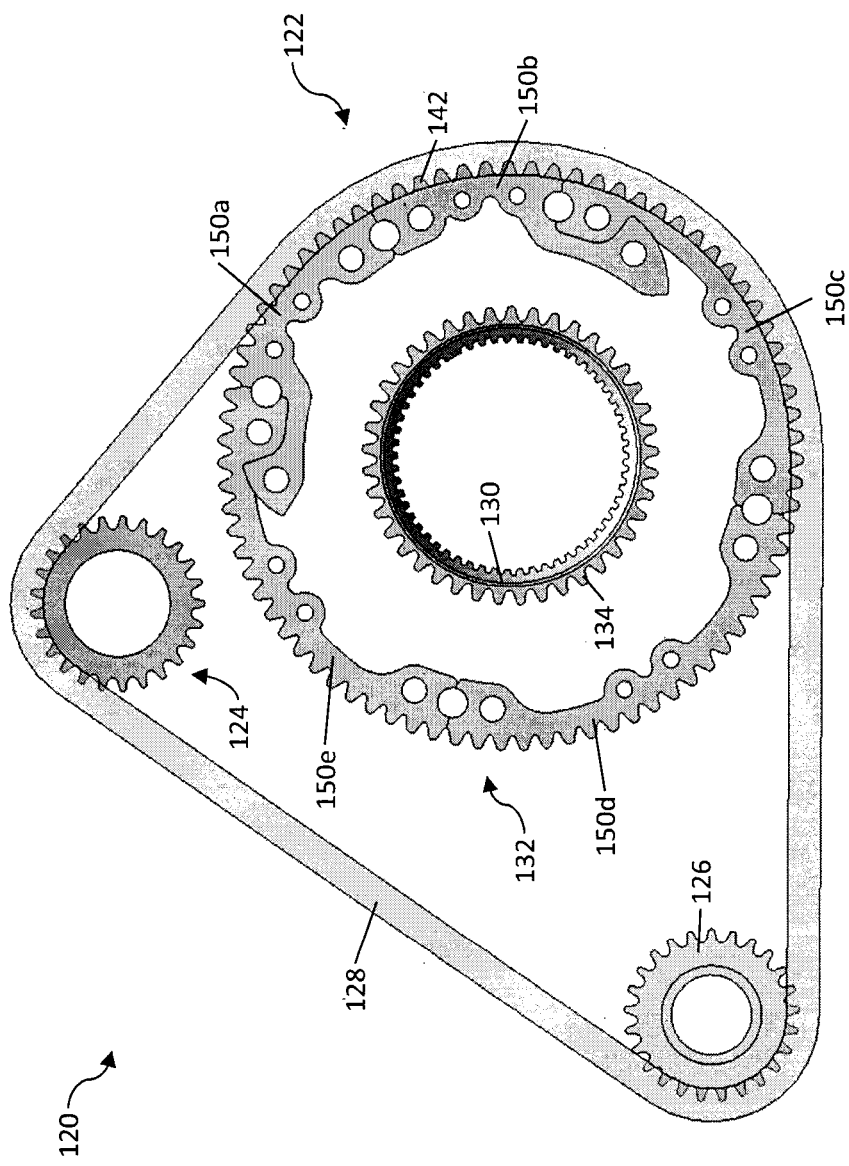

At the steps shown in FIGS. 4 to 6, the remaining pulley segments 150c to 150e are sequentially moved into the engaged region while individually positioned in the non-contact zone of the first pulley assembly 122. As the first pulley assembly 122 rotates, the remaining pulley segments 150c to 150e will rotationally follow the pulley segment 150b into the contact zone and will engage the endless member 128. Once all of the pulley segments 150a to 150e are in the engaged region, the first pulley assembly 122 can operate with the endless member 128 continuously engaging the outer peripheral surface 142 of the second pulley 132. Accordingly, the shift event that transitions the endless member 128 from engaging the first pulley 130 to engaging the second pulley 132 is complete.

FIGS. 7 to 11 show a sequence for a shift event that transitions the endless member 128 from engaging the second pulley 132 to engaging the first pulley 130. Prior to the shift event, the endless member 128 is engaged with the second pulley 132 of the first pulley assembly 122, as shown in FIG. 6. Accordingly, the plurality of pulley segments 150a to 150e are all located in the engaged region.

Figure 7:
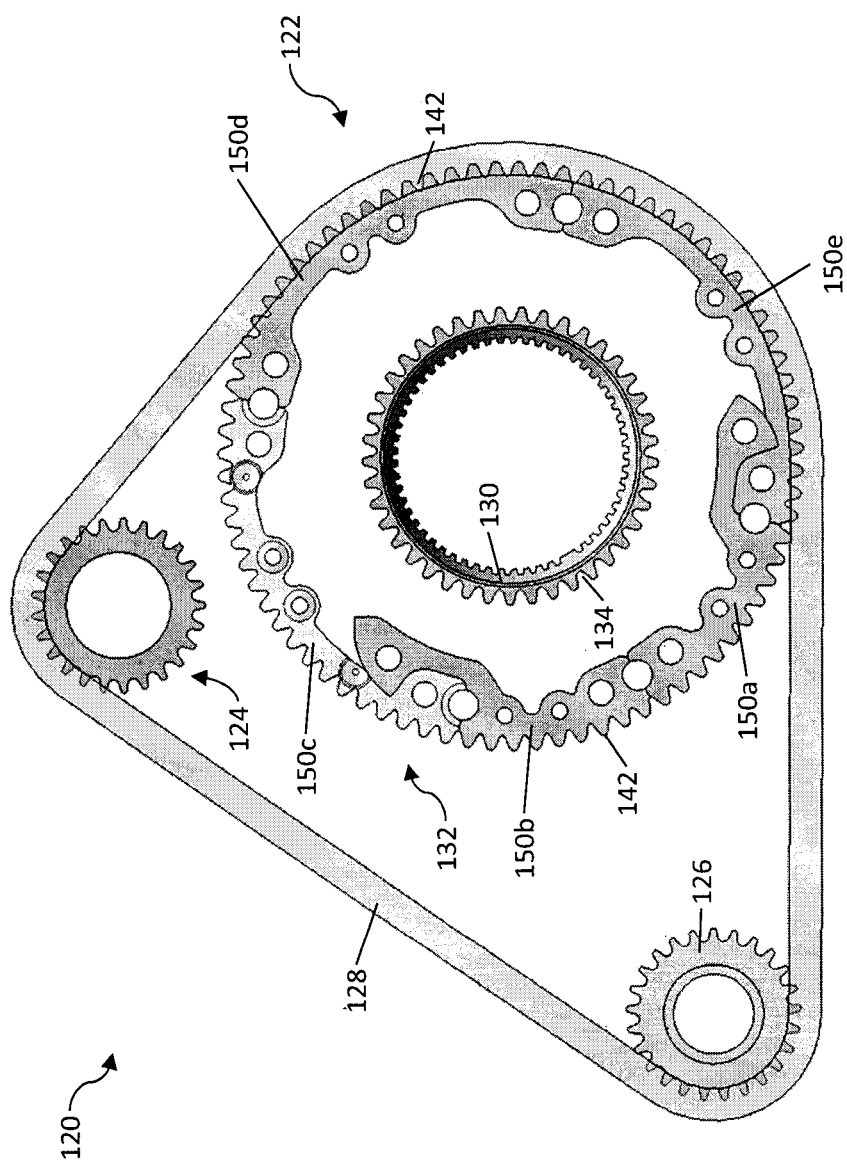
FIGS. 7 to 11 are simplified front views of the segmented pulley transmission of FIG. 1, showing a sequence for transitioning the endless member from the second pulley to the first pulley in the segmented pulley transmission.
Figure 8:
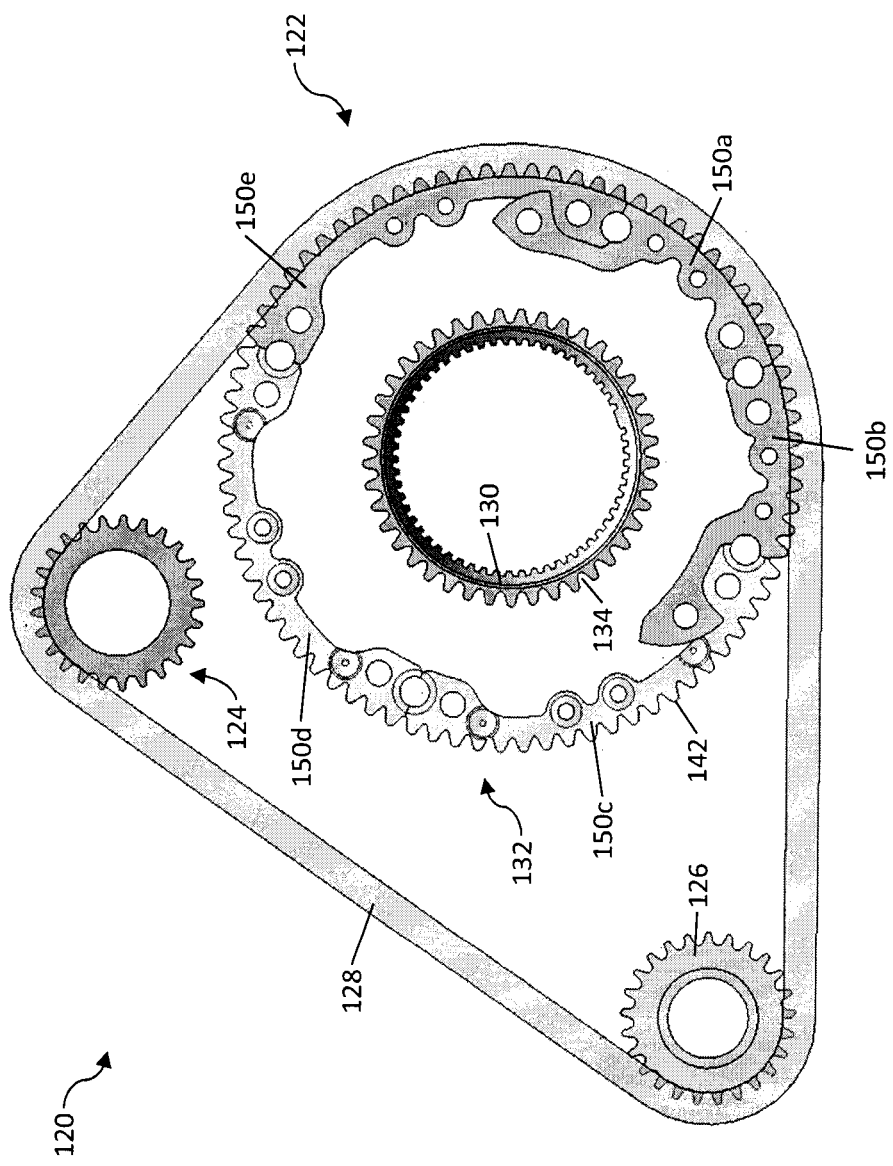
Figure 9:
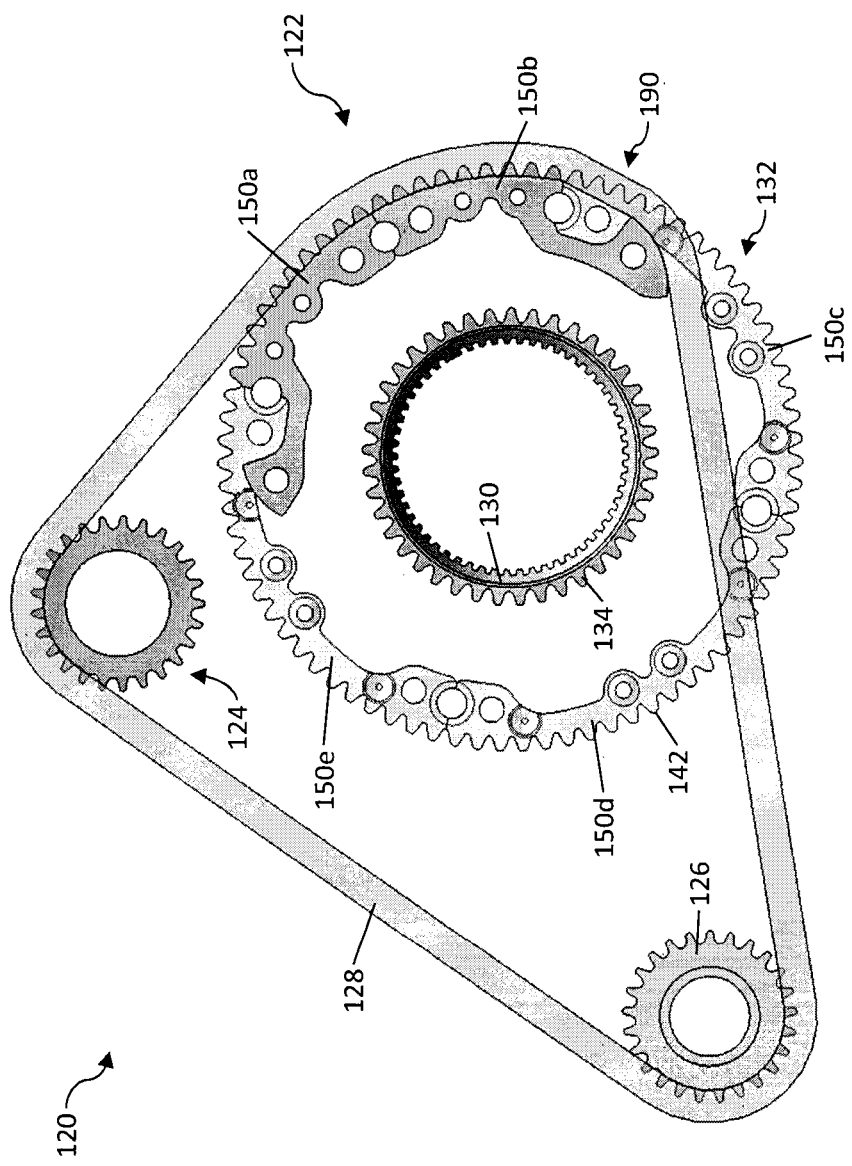

At the steps shown in FIGS. 7 to 9, the pulley segments 150c to 150e are sequentially moved out of the engaged region, while individually positioned in the non-contact zone of the first pulley assembly 122. As will be appreciated, in the subject embodiment, the pulley segments 150a to 150e are moved out of the engaged region by transversely retracting the pulley segments 150a to 150e out of the plane defined by the endless member 128. Accordingly, as the first pulley assembly 122 rotates, the pulley segments 150c to 150e will not engage the endless member 128. Instead, as shown in FIG. 9, the endless member 128 will engage the portion of the outer peripheral surface defined by the body of the pulley segment 150b and, subsequently, the transition surface 162 of the integrated support 152 of the pulley segment 150b. The integrated support 152 of the pulley segment 150b inhibits the endless member 128 from bending beyond the maximum permissible radius as the endless member 128 transitions from the second pulley 132 to the first pulley 130. As will be appreciated, since the integrated support 156 includes a recess 164, when the endless member 128 extends across the recess 164, a portion 192 of the endless member 128 will be unsupported. This unsupported portion 192 extends from the transition surface 162 to the portion of the outer peripheral surface 142 defined by the body of the pulley segment 150b, and may be generally straight (as shown in FIG. 9).

Figure 10:
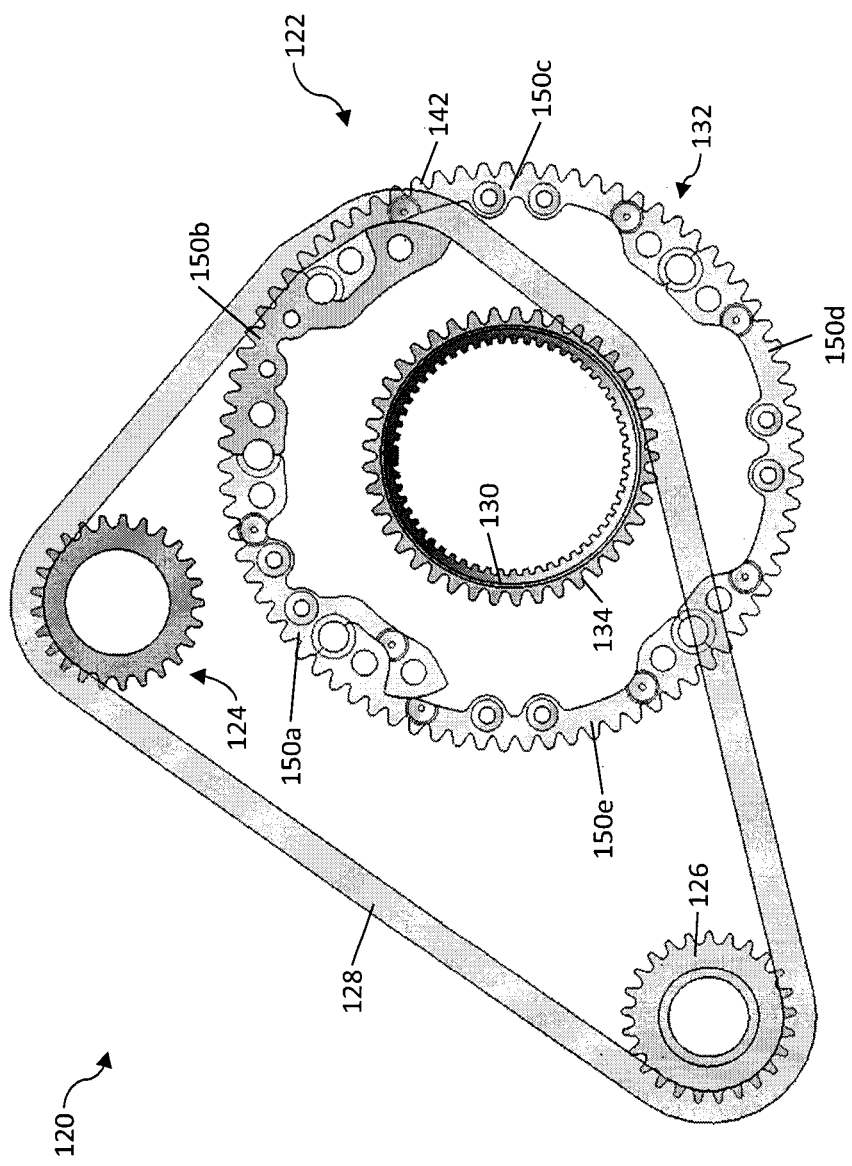
Figure 11:
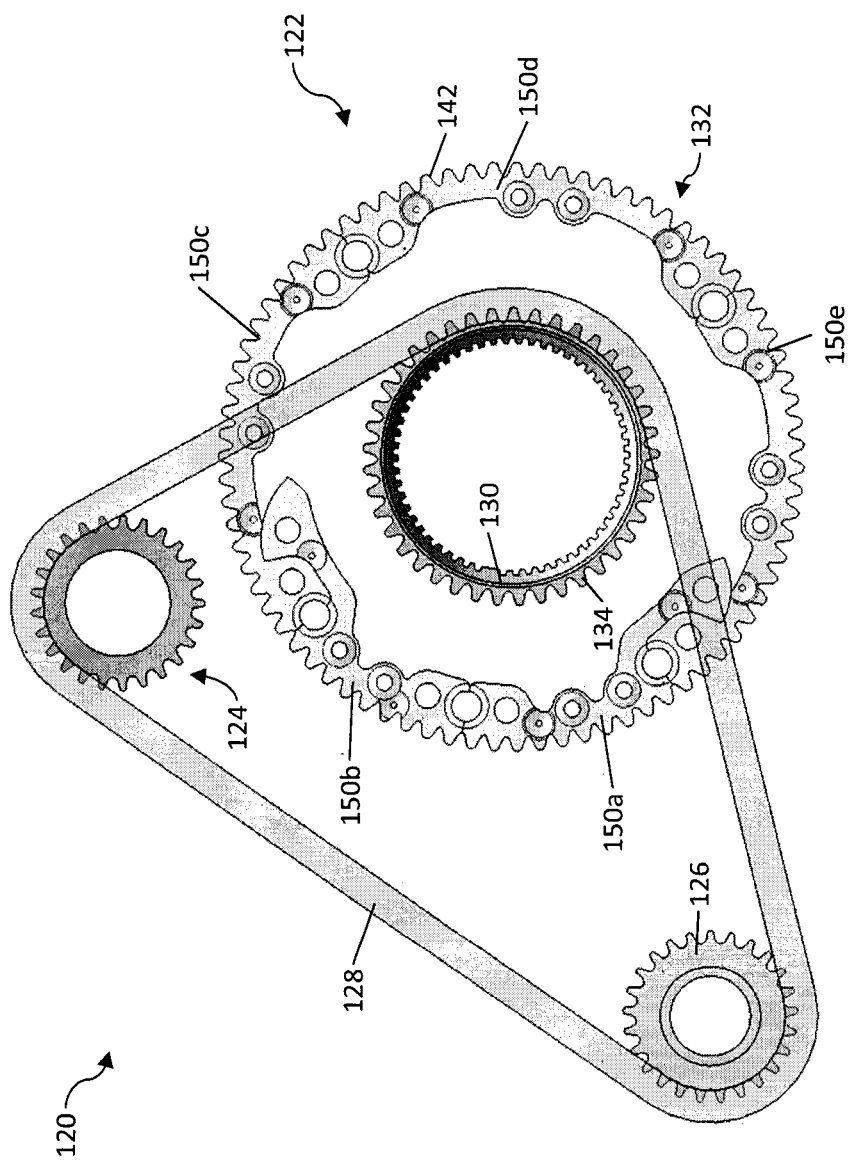

At the steps shown in FIGS. 10 and 11, the remaining pulley segments 150a, 150b are sequentially moved out of the engaged region while individually positioned in the non-contact zone of the first pulley assembly 122. Accordingly, as the first pulley assembly 122 rotates the pulley segments 150a, 150b will not engage the endless member 128. Once the pulley segments 150a, 150b are both moved out of the engaged region, the first pulley assembly can operate continuously with the endless member 128 engaging the outer peripheral surface 134 of the first pulley 130. Accordingly, the shift event that transitions the endless member 128 from engaging the second pulley 132 to engaging the first pulley 130 is complete.

Although the first pulley system 122 has been shown and described herein as comprising two concentric pulleys, namely the first pulley 130 and the second pulley 132, it will be appreciated that in other embodiments the first pulley system may comprise a greater number of concentric pulleys when further ratios for the segmented pulley transmission 120 are desired.

Although the plurality of pulley segments 150a to 150e have been shown and described herein as including two transition segments 150a, 150b, it will be appreciated that in other embodiments the plurality of pulley segments may comprises a single transition segment. In such embodiments, the single transition segment may include one or more of the integrated supports 156. In some embodiments, the single transition segment includes two of the integrated supports 156, extending from opposing sides of the single transition segment. One of the integrated supports 156 can be configured to support the endless member 128 when transitioning the endless member 128 from the first pulley 130 to the second pulley 132, and the other of the integrated supports 156 can be configured to support the endless member 128 when transitioning from the second pulley 132 to the first pulley 130.

Although the integrated support 156 has been shown and described herein as comprising a single proximal portion 158 and a single distal portion 160, it will be appreciated that in other embodiments the integrated support may comprise a plurality of proximal portions and/or a plurality of distal portions. Similarly, although the integrated support 156 has been shown and described herein as comprising a single recess 164, it will be appreciated that in other embodiments the integrated support may comprise a plurality of recesses.

Each recess may be configured to receive a respective enlarged portion of one or more adjacent pulley segments.

Although embodiments have been described above and are shown in the accompanying drawings, it will be appreciated by those skilled in the art that variations and modifications may be made without departing from the scope as defined by the appended claims, and the scope of the claims should be given the broadest interpretation consistent with the specification as a whole.

What is claimed is:

1. A segmented pulley defining an outer peripheral surface for engaging an endless member of a segmented pulley transmission, the segmented pulley comprising:
  a plurality of pulley segments configured to be sequentially movable between an engaged region and a disengaged region to transition the endless member between the segmented pulley and a concentric pulley in the segmented pulley transmission, each of the pulley segments having a body defining a portion of the outer peripheral surface,
  wherein the plurality of pulley segments includes a transition segment having an integrated support extending from the body of the transition segment, the integrated support being configured to support the endless member when transitioning the endless member between the segmented pulley and the concentric pulley in the segmented pulley transmission, and the integrated support comprising:
    a transition surface for supporting the endless member when transitioning the endless member between the segmented pulley and the concentric pulley; and
    a recess for accommodating a portion of an adjacent pulley segment in the plurality of pulley segments,
    wherein the transition surface is spaced apart from the body of the transition segment by the recess.

2. The segmented pulley of claim 1, wherein the integrated support extends circumferentially beyond the portion of the outer peripheral surface defined by the body of the transition segment.

3. The segmented pulley of claim 1, wherein the transition surface is spaced apart from the portion of the outer peripheral surface defined by the body of the transition segment.

4. The segmented pulley of claim 1, wherein the integrated support includes a proximal portion and a distal portion, and wherein the distal portion defines the transition surface.

5. The segmented pulley of claim 4, wherein the recess the recess is defined in the proximal portion of the integrated support.

6. The segmented pulley of claim 1, wherein the portion of the adjacent pulley segment is an enlarged portion that is configured to provide physical support to the adjacent pulley segment during rotational operation of the segmented pulley transmission.

7. The segmented pulley of claim 6, wherein the enlarged portion includes a physical support feature for providing the physical support to the adjacent pulley segment.

8. The segmented pulley of claim 7, wherein the physical support feature is a hole defined in the enlarged portion, for engaging a support rod of the segmented pulley transmission to provide the physical support to the adjacent pulley segment.

9. The segmented pulley of claim 1, wherein the plurality of pulley segments includes two of the transition segments that are oppositely oriented in the plurality of pulley segments.

10. The segmented pulley of claim 1, wherein the integrated support is configured to inhibit the endless member from bending beyond a predetermined minimum bend radius, when transitioning the endless member between the segmented pulley and the concentric pulley in the segmented pulley transmission.

11. The segmented pulley of claim 1, wherein the integrated support is configured to control slack in the endless member between the segmented pulley and the concentric pulley, when transitioning the endless member between the segmented pulley and the concentric pulley in the segmented pulley transmission.

12. A segmented pulley transmission for rotationally coupling a first rotatable member and a second rotatable member in a power train, the segmented pulley transmission comprising:
  a first pulley assembly for coupling to the first rotatable member, the first pulley assembly comprising a first pulley and a second pulley concentric with the first pulley, the second pulley being a segmented pulley as defined in claim 1;
  a second pulley assembly for coupling to the second rotatable member and spaced apart from the first pulley assembly; and
  an endless member engaging the first pulley assembly and the second pulley assembly and extending therebetween, to rotationally couple the first pulley assembly and the second pulley assembly.

13. The segmented pulley transmission of claim 12, further comprising an idler pulley engaging the endless member and configured to control slack in the endless member.

14. The segmented pulley transmission of claim 12, further comprising an actuator coupled to the plurality of pulley segments of the segmented pulley and configured to sequentially move the plurality of pulley segments between the engaged region and the disengaged region, to transition the endless member between the first pulley and the second pulley.

15. The segmented pulley of claim 1, wherein the transition surface is spaced apart from the body of the transition segment by the recess such that a portion of the endless member that extends over the recess will be unsupported when transitioning the endless member between the segmented pulley and the concentric pulley.

16. The segmented pulley of claim 6, wherein the enlarged portion includes a plurality of teeth at the outer peripheral surface thereof.

* * * * *